United States Patent [19]

Miller

[11] Patent Number: 4,805,215

[45] Date of Patent: Feb. 14, 1989

[54] ADAPTIVE ECHO CANCELLER WITH SPARSE DYNAMICALLY POSITIONED TAPS

[75] Inventor: Jerry A. Miller, Sunrise, Fla.

[73] Assignee: Racal Data Communications Inc., Sunrise, Fla.

[21] Appl. No.: 913,928

[22] Filed: Oct. 1, 1986

[51] Int. Cl.⁴ .......................................... H04B 3/23
[52] U.S. Cl. ..................................... 379/411; 370/32.1
[58] Field of Search ............... 379/406, 407, 409, 410, 379/411, 345; 370/32, 32.1

[56] References Cited

U.S. PATENT DOCUMENTS

| | | | |
|---|---|---|---|
| 3,535,473 | 10/1970 | Flanagan et al. | 379/410 |
| 3,721,777 | 3/1973 | Thomas | 379/410 |
| 3,723,911 | 3/1973 | Forney, Jr. | 333/18 |
| 3,787,645 | 1/1974 | Ochiai et al. | 379/410 |
| 4,024,357 | 5/1977 | Sourgens et al. | 379/411 |
| 4,087,654 | 5/1978 | Mueller | 379/411 |
| 4,464,545 | 8/1984 | Werner | 370/32.1 |
| 4,578,544 | 3/1986 | Colin de Verdiere et al. | |
| 4,582,963 | 4/1986 | Danstrom | 379/411 |
| 4,593,161 | 6/1986 | Desblache et al. | |
| 4,602,133 | 7/1986 | O'Neill | 370/32.1 |
| 4,732,410 | 5/1986 | Mackechnie | 379/406 |

FOREIGN PATENT DOCUMENTS

| | | | |
|---|---|---|---|
| 0237508 | 4/1985 | European Pat. Off. | 379/410 |
| 1957637 | 9/1980 | Fed. Rep. of Germany | 379/411 |
| 0107928 | 6/1985 | Japan | 370/32.1 |

OTHER PUBLICATIONS

U.S. translation of Japanese Patent Publication 57-42242, United States Patent and Trademark Office.
IBM Technical Disclosure Bulletin, vol. 21, No. 5, Oct. 1978, (New York, U.S.) "Centering Transversal Equalizer Tap Coefficients".
IEEE Global Telecommunications Conference, Houston, Texas, Dec. 1–4, 1986, "A DSP-Based Echo-Canceller with Two Adaptive Filters", pp. 1674–1678.
*Signal Analysis*, Athanasios Papoulis, 1977.
Shin-ichi Kawamura and Mitsutoshi Hatori, "A Tap Selection Algorithm for Adaptive Filters", Proceedings of ICASSP, pp. 2979–2982, 1986.
Makoto Itami, Takashi Mochizuki and Mitsutoshi Hatori, "Hardware Implementation of FM Multipath Distortion Canceller", Proc. of ICASSP, pp. 1301–1304, 1986.
Bede Lie, "Effect of Finite Word Length on the Accuracy of Digital Filters–A Review", IEEE Trans. Circuit Theory, pp. 361–369, Nov. 1971.
Oscar Agazzi, David G. Messerschmitt and David A. Hodges, "Nonlinear Echo Cancellation of Data Signals", IEEE Transactions on Communications, pp. 2421–2433, Nov. 1982.
Stephen B. Weinstein, "Echo Cancellation in the Telephone Network", IEEE Communications Society Magazine, pp. 9–15, Jan. 1977.
M. M. Sondhi, "An Adaptive Echo Canceller", The Bell System Technical Journal, pp. 497–511, Mar. 1967.

*Primary Examiner*—Jin F. Ng
*Assistant Examiner*—Randall S. Vaas
*Attorney, Agent, or Firm*—Jerry A. Miller

[57] ABSTRACT

This invention relates to an echo canceller, for a transmission line, including a shift register having an input for receiving an input signal from a signal source and having a plurality of output taps for providing a plurality of equally spaced delayed signals. A tap coefficient storage memory stores a plurality of tap coefficients. A multiplier multiplies certain of the delayed signals by certain tap coefficients to produce multiplier outputs. A tap allocation circuit determines, on a tap by tap basis, how many and which of the taps are to be turned ON so that its corresponding tap coefficients are multiplied by the multiplier. A subtracter cancels echoes by subtracting the multiplier outputs from signals received on the transmission line. Taps which are turned OFF may be assigned a status of STANDBY and these taps may be activated to compensate for changes in the characteristics of the transmission line.

20 Claims, 7 Drawing Sheets

ADAPTIVE ECHO CANCELLER WITH SPARSE DYNAMICALLY POSITIONED TAPS

CROSS REFERENCE TO RELATED APPLICATION

This application is related to a copending patent application filed simultaneously herewith to Aldo Martinez entitled "Echo Canceller With Dynamically Positioned Adaptive Filter Taps", Ser. No. 913,929 filed 10-1-1986 assigned to the Assignee of the present invention. This application is incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

This invention relates generally to the field of adaptive transversal filters such as those used in echo cancellers and more particularly to an adaptive echo canceller having dynamically positioned sparse adaptive filter taps and to a method for allocating and updating the positions of the taps.

2. Background of the Invention

Impedance mismatches and other circuit discontinuities in telephone lines often result in the presence of echoes on such lines. These mismatches generally occur at 2 wire to 4 wire and 4 wire to 2 wire transitions. Such echos produce confusion in the case of voice communication and may cause data errors in the case of data communication if the echo is severe enough. This is of course undesirable in voice communications, but may be intolerable in data communication. In full duplex or even half duplex analog (modem) and digital data communications circuits, such echoes are interpreted by a receiver as noise which can corrupt incoming received signals causing reduced data throughput and/or data errors.

Such echo signals have been canceled in the prior art with echo cancellers such as that shown in FIG. 1. In this arrangement, which is similar to that presented in the Bell System Technical Journal, Vol. XLVI, Number 3, March 1967 entitled "An Adaptive Echo Canceller" by Shondi et al, a signal source 10 produces a digital signal which is converted to an analog signal by digital to analog converter 12 prior to application to a hybrid transformer circuit 14. Hybrid 14 is coupled to a two wire transmission line 16 which is also used to receive incoming signals which are applied to an analog to digital converter 18. The analog to digital converter 18 passes the received signals on to a receiver 20 for processing.

The remaining circuitry comprises an echo canceller which is in the form of a transversal filter (generally) which is placed between the transmit and receive paths as shown. The echo canceller includes a tapped delay line or shift register 24 coupled to the output of signal source 10. The shift register has periodic output taps which are coupled to a plurality of multipliers 28. The multipliers 28 are also coupled to a tap coefficient memory 32 which stores the tap weights or tap coefficients for the transversal filter. These tap weights may represent the impulse response of the transmission line 16. The outputs of the multipliers 28 are summed together at an adder 36 producing a replica of the echo1 signal returned by the transmission line in response to the transmitted signal from signal source 10. This, of course, assumes that the echo signal may be replicated by a weighted sum of delayed input signals from signal source 10. This echo replica is in the form of:

$$\hat{e} = \sum_{N=1}^{K} C_N X(NT) \quad \text{Equation 1:}$$

Where:
  N = a tap number
  K = the number of taps in the echo canceller
  T = the sampling interval
  $C_N$ = tap weight at position N
  $X_N$ = sample of output of signal source at tap N
  $\hat{e}$ = echo replica.

This echo replica e is subtracted at subtracter 40 from the incoming signal at the output of the analog to digital converter 18 in order to cancel the echo signal so that only the transmitted signal plus noise and an error signal (from imperfect echo cancellation) remain as follows:

$$\hat{Y}(NT) = Y(NT) + n(NT) + e(NT) - \hat{e}(NT) \quad \text{Equation 2:}$$
$$= Y(NT) + n(NT) + \epsilon(NT)$$

Where:
  Y = the desired transmitted signal
  Y = the received signal after echo cancellation
  n = noise
  e = the echo signal
  $\epsilon$ = the error between the echo replica and the actual echo.

Such echo signals (impulse responses) may take on many forms with the most common being that of a near end echo (resulting from discontinuities and mismatches at a local telephone office) plus far end echoes (resulting from such discontinuities or mismatches at remote telephone offices). An example of such echoes is shown in FIG. 2 where the near end echo is represented by echo 50 and the far end echo is represented by echo 52.

In the example of FIG. 2, near end echo 50 is shown to be approximately the same magnitude as echo 52. Another possibility is shown in FIG. 3 with an echo 60 representing the near end echo and a somewhat smaller echo 62 representing the far end echo. Of course, an unlimited number of other possible echo situations exist and those presented here are only presented by way of example.

One of the more common techniques for dealing with the combination of near end plus far end echoes is described in U.S. Pat. No. 4,464,545 to Werner. This echo canceller structure utilizes a near end sub-canceller to cancel the near end echo and a far end sub-canceller to cancel to the far echo. The two sub-cancellers are separated by a bulk delay unit to account for the silent period of no echos between the near end and far end echoes. This structure, in order to be optimally effective, requires knowledge of when in time an echo is likely to occur and how long each echo will last so that the length of the near end and far end echo canceller and the duration of the bulk delay may be established. Also, in the case of the echo of FIG. 3, computational noise may be generated by virtue of too many taps used to cancel the relatively small echo 62.

U.S. Pat. No. 4,582,963 improves upon this echo canceller arrangement by allowing the bulk delay unit to be variable. In this patent, the variable bulk delay allows for varying distances between the local and remote offices so that the near end canceller and far end canceller can be more optimally situated in time to enhance the likelihood of good cancellation of both the near end and far end echoes.

Unfortunately, neither of the arrangements shown in the abovereferenced patents can account for an echo signal such as that shown in FIG. 4. In this echo signal, a near end echo 70 is followed by an intermediate echo 72 which is then followed by a far end echo 74. According to published studies by Bell Telephone Laboratories, intermediate echoes occur in approximately 30% of all long distance connections. The echo cancellers of Werner and U.S. Pat. No. 4,582,963 to Danstrom are unable to cope with such intermediate echoes thus, substantial corruption of data or voice signals may occur as a result.

A paper published at the I.C.A.S.S.P. 86 in Tokyo entitled "A Tap Selection Algorithm For Adaptive Filters", Kawamura et al., describes a tap adaption algorithm entitled "Scrub Taps Waiting In a Queue" or "STWQ" which may allow a digital adaptive filter to ultimately adapt to such an intermediate echo 22 as shown in FIG. 3. Unfortunately, such an algorithm has another drawback encountered by the two previously mentioned types of echo cancellers. Namely, that it is undesirable for an echo canceller to operate when there is no echo. Running an echo canceller under such circumstances merely creates computational noise as a result of finite word length accuracy in the digital transversal filter. This may actually hinder the reception of data in a marginal line. This paper also suggests that the canceller is best adapted from a random or evenly distributed initial allocation of the fixed number of taps which are allowed.

It is therefore desirable to provide a digital echo canceller structure which overcomes many of the drawbacks associated with conventional echo canceller structures.

SUMMARY OF THE INVENTION

It is therefore an object of the present invention to provide an improved echo canceller circuit which reduces computational noise when there is no echo to cancel.

It is another object of the present invention to provide an improved echo canceller structure which adapts readily to intermediate echoes.

It is a further object of the present invention to provide an improved echo canceller structure which readily adapts to many arbitrary echo responses.

It is another object of the present invention to provide a method and apparatus for allocating and adapting taps in an echo canceller structure having variable tap locations.

It is another object of the present invention to provide an echo canceller which dynamically allocates taps to provide near optimal utilization of a limited number of taps.

It is yet a further object of the present invention to provide an echo canceller structure whose variable tap locations may be rapidly selected without need for large numbers of time consuming mathematical operations while resulting in good echo cancellation and near optimum tap selection.

It is another object of the present invention to provide an echo canceller which reduces computational noise and readily adapts to changing transmission line characteristics.

These and other objects of the invention will become apparent to those skilled in the art upon consideration of the following description of the invention.

In one embodiment of the present invention, an echo canceller, for a transmission line, includes a shift register having an input for receiving an input signal from a signal source and having a plurality of output taps for providing a plurality of equally spaced delayed signals. A tap coefficient storage memory stores a plurality of tap coefficients. A multiplier multiplies certain of the delayed signals by certain tap coefficients to produce multiplier outputs. A tap allocation circuit determines, on a tap by tap basis, how many and which of the taps are to be turned on so that its corresponding tap coefficients are multiplied by the multiplier. A subtracter cancels echoes by subtracting the multiplier outputs from signals received on the transmission line. The tap allocator determines which and how many taps to turn on by determining which taps contribute significantly to the echo canceller's performance.

In another embodiment of the present invention a method of allocating filter taps in an echo canceller for a transmission line, includes storing a plurality of samples of signal representative of said transmission line's impulse response in a memory; examining each of the plurality of stored samples to determine if its magnitude is greater than a predetermined threshold; and assigning non-zero weighting values to only those taps of the echo canceller corresponding to samples greater in magnitude than the predetermined threshold.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

The present invention ameliorates the above problems by allocating echo canceller taps on a tap-by-tap basis only to samples where there is actually a significant echo present. That is, the overall echo canceller structure resembles a conventional echo canceller having a very large tapped delay element. But, only certain individual taps or groups of taps are actually "turned ON" at any given time creating a "sparse" transversal filter structure in some instances. In general, it is likely that the majority of the taps will be "turned OFF". The present invention examines the impulse response of the line (which corresponds to tap weights for a transversal filter) as measured during a training period and allocates taps according to the location of significant echo energy is actually present on a tap by tap basis. The terms "tap weight" and "tap coefficient" are used interchangeably herein to mean the gain or weighting factor applied to each tap location sample by a multiplier.

Figure 5:
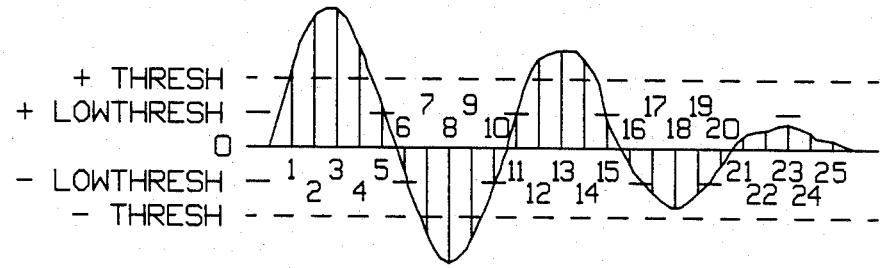
FIG. 5 shows an enlarged portion of an echo signal illustrating the tap selection process of the present invention.

To illustrate the principle of the present invention, the echo (transmission line impulse response) of FIG. 5 is used as an example. It is presumed that this echo signal is stored in memory and such storage may be effected by any of a number of known training techniques for echo cancellers. For example, an approximate impulse signal can be applied to the transmission line of interest and the echo signal measured in response to that impulse. This impulse response may then be used as the tap weights (either with or without windowing as desired) for a transversal filter structure according to the present invention. Other techniques are known in the art. After the impulse response is stored in memory, each of the tap weights are individually evaluated to determine whether or not it contributes significantly to the echo. Significant echo cancellation is determined by various factors including acceptable echo canceller performance (which varies significantly from application to application, e.g. voice requirements and high speed data communication requirements may be radically different) and available processing power. In the preferred embodiment, this is initially accomplished by comparing the magnitude (absolute value) each of the impulse response (tap weight) samples with a predetermined threshold and turning ON only those taps whose absolute value exceeds that threshold. The rest of the taps are kept "OFF" for purposes of echo cancellation (but their values may be retained in memory for possible future use).

In the example illustrated in FIG. 5, the threshold is shown in broken lines. Both positive and negative limits are shown but it will be appreciated that this is equivalent to a comparison of the impulse response's absolute value with a single positive threshold. It may also be desirable to equivalently use the square of the impulse response in some embodiments if it proves to be computationally efficient. In this example, a total of 25 taps (samples of the impulse response) are shown at equally spaced increments of time, but of course this is not to be limiting as many echo cancellers or similar devices will require a total of possibly hundreds of taps. In this simple example, the sampled echo energy exceeds the threshold at a total of 10 of the possible 25 taps. These taps are those which contribute most heavily to the echo problem and they are therefore selected to be canceled. The selected taps which are turned ON are: 1-4, 7-9 and 12-14. The remainder of the taps are left OFF (given zero weight) for purposes of cancellation of the echo. Thus, in this simple example, the computation power which would normally be used to operate a 25 tap canceller can be reduced substantially to that required for only a 10 tap canceller plus the overhead required to manage which taps are ON or OFF. In many instances, this can provide a substantial savings in computing power. In addition, the echo canceller itself is not generating unnecessary computational noise by attempting to cancel insignificant echo energy.

In this simple example, the echo estimate is given by the following relationship:

Equation 3

$$\hat{e} = \sum_{N=1}^{4} C_N X(NT) + \sum_{N=7}^{9} C_N X(NT) + \sum_{N=12}^{14} C_N X(NT)$$

This relationship may be generalized by Equation 4, which describes the function of the echo canceller of the present invention:

$$\sum_{N=F(N)}^{K} C_N X(NT)$$

Equation 4

Where:
F(N) is a sequence of integers corresponding to those taps which are to be turned ON.

This differs from the echo replica of equation 1 in that all tap weights having magnitude less than the threshold are ignored (approximated by zero). In practice, this will have little effect on the echo canceller's performance when a stable (not time varying) echo is being replicated for cancellation provided the threshold is appropriately selected so that significant taps are not turned OFF. The appropriate selection of the threshold may be made experimentally and may require variation based upon a typical type of echo present on a given line. As a starting point, a selection of approximately 5 to 15 percent of the peak value of the echo impulse response will yield adequate levels of echo cancellation in many circumstances since samples lower than this range generally do not contribute heavily to the echo. The exact selection of the threshold should be based upon the required level of echo cancellation with lower thresholds resulting in larger numbers of taps turned ON and smaller residual echo. In any event, the threshold should usually be set above the noise floor of the system and within the lower levels of digital quantization about zero, but this is not to be limiting.

An advantage of the present process for selection of taps to turn ON or OFF is that it requires very little computing power since all decisions are made based upon comparison operations rather than multiplication and divisions. Comparison operations typically take only several cycles to perform whereas multiplications and divisions frequently require tens or hundreds of clock cycles to perform. For example, for the Motorola ® 68000 series microprocessor, a multiply operation takes approximately 70 cycles and a divide takes approximately 160 cycles. A compare, on the other hand, takes only about 10 cycles. Also, the reduced number of taps used to cancel the echo allows less computer power to be used for echo cancellation and for the adaption process of the ON taps. Since such cancellation and adaption typically involve numerous multiply, divide and numerical integration processes, those processes are also heavy users of computer time.

In order to cope with variations in the echo characteristics over time as a result of amplitude changes, phase roll, phase hits, phase jitter and in general changes in line characteristics, the present invention preferably utilizes an adaption scheme which allows not only for variation of tap weight values but also for variations in which taps are actually turned ON at any given time. This is accomplished by selecting a group of taps which are most likely to be required and placing those taps in a STANDBY status. In the event echo canceller performance degrades to a level approaching unacceptability, these STANDBY taps are switched ON and adapted according to normal adaption schemes (such as steepest descent) until the cancellation is once again acceptable. At this point, any unnecessary taps may be turned OFF (or to STANDBY). In addition, as part of normal adaption of taps which are turned ON, if their value falls below a threshold, they may be dropped since their contribution to the canceller's performance is then insignificant. The threshold at which taps may be dropped is preferably set at a level lower than that of initial tap selection. This provides a level of noise immunity by hysteresis and thereby prevent continual shifting in and out of marginal taps. This second level is preferably set at approximately 3 dB below that of the original threshold but this is not to be limiting as the level of hysteresis should be determined experimentally to provide an appropriate compromise. It is also preferable that an average be made of the tap value as it is adapted to provide a smooth function for comparison with the threshold. However, it is recognized that this may require additional computing power and may therefore be impractical in some circumstances.

In one embodiment of the present invention the process of selecting STANDBY taps is carried out by assuming that the most likely taps to be required as the line conditions change are those adjacent the taps which are ON. In the event of simple phase roll, jitter or shift, this is likely to be an accurate guess as to which taps will be required. In the example of FIG. 5, the taps which would be turned ON according to this guess are 5, 6, 10, 11 and 15. If, for example, a sudden phase shift to the right of one sampling period were encountered, turning ON all STANDBY taps would result in proper operation of the canceller after several adaption cycles. In this event, the tap status shown in Table 1 would result.

The STANDBY taps may either remain at their original value or some form of interpolation may be used to speed up adaption once the STANDBY taps are turned ON. In either event, the STANDBY taps are adapted until it can be determined which taps should properly remain ON. After this, unnecessary taps may be turned OFF (or STANDBY).

TABLE 1

|  | ON TAPS | OFF TAPS | STANDBY TAPS |
|---|---|---|---|
| TAP STATUS AS ORIGINALLY SELECTED | 1-4 7-9 12-14 | 16-25 | 5,6,10, 11,15 |
| TAP STATUS AFTER ONE SAMPLE PERIOD | 2-5 8-10 | 17-25 | 1,6,7,11, 12,16 |

TABLE 1-continued

|  | ON TAPS | OFF TAPS | STANDBY TAPS |
|---|---|---|---|
| PHASE SHIFT | 13-15 | | |

In another embodiment, STANDBY taps are selected by examining the taps which are below the ON threshold (that is, OFF taps) and by comparing these taps with another threshold, for example ½ of the original tap selection threshold. In this example, the taps selected as STANDBY taps would be those between the ON threshold and the lower threshold so that the STANDBY taps would be given by Table 2.

TABLE 2

| ON TAPS | OFF TAPS | STANDBY TAPS |
|---|---|---|
| 1-4,7-9,12-14 | 6,11,15,16,20-25 | 5,10,17-19 |

If there is a maximum allowable number of ON taps (M), the OFF taps may be sorted and the largest OFF taps selected as STANDBY taps within the constraints of the maximum number of taps. It should be noted that STANDBY taps can become ON taps and should be selected such that M is greater than or equal to the ON taps plus the STANDBY taps.

In the preferred embodiment, a combination of the above methods is used so that the following taps are set to STANDBY initially in the example of FIG. 5: 5, 6, 10, 11, 15, 17-19. Except for radical changes in line characteristics, this selection of STANDBY taps provides good ability to adapt to variations. This is important to prevent interruption of data flow in a data communication environment due to continuing need for retraining of the echo canceller.

Figure 6:
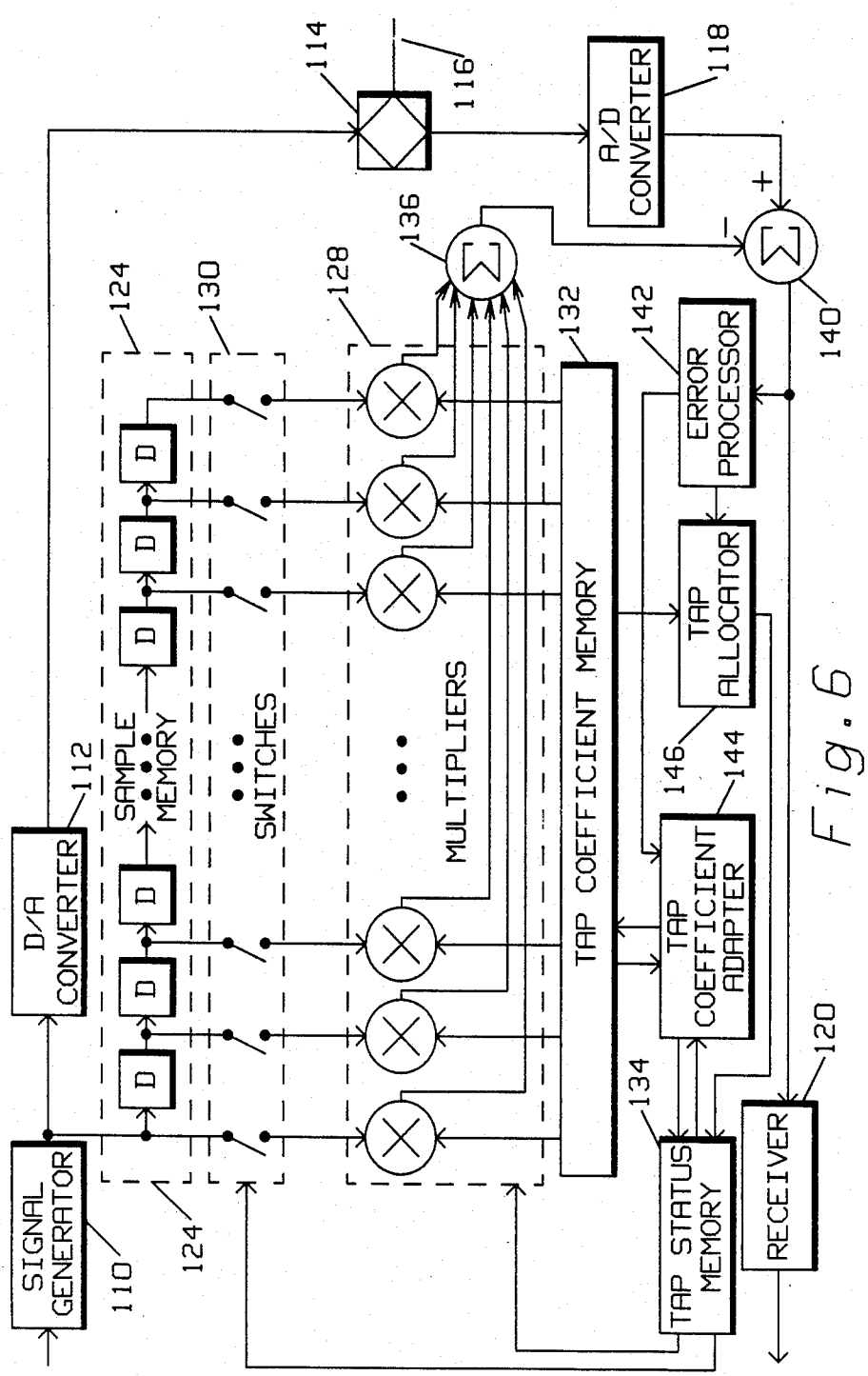
FIG. 6 shows a functional block diagram of the echo canceller of the present invention.

Turning now to FIG. 6, a functional block diagram is shown for the echo canceller of the present invention. Of course it will be understood by those skilled in the art that the present invention is preferably implemented using microcomputer technology so that the bulk of the functional blocks of the echo canceller shown in FIG. 6 are actually implemented using a programmed microcomputer.

In FIG. 6, a signal source 110 which may be either a source of voice or data signals provides a digitized signal at its output to a digital to analog converter 112. Digital to analog converter 112 in turn provides an analog representation of the signal at the output of 110 to an input of hybrid 114. Hybrid 114 then applies the analog signal to a two wire transmission line 116. Incoming signals on transmission line 116 are provided to analog to digital converter 118 which passes the incoming signal on to a receiver 120 for further processing.

In the echo canceller of the present invention, represented by the remaining circuitry of FIG. 6, the digital signal at the output of 110 is also provided to a shift register or delay line 124 having a plurality of periodic output taps. Shift register 124 is preferably implemented using conventional random access memory (RAM). Each of these taps may be selectively applied to a plurality of multipliers 128 by appropriate opening or closure of switches 130. Switches 130 are open if the tap is OFF or on STANDBY and closed if the tap is ON. At a second input to multipliers 128, tap coefficients are provided to the multipliers from a tap coefficient memory 132. Those skilled in the art will recognize that it is desirable for multipliers 128 to completely cease functioning at those taps which are turned OFF or on STANDBY so that processing power of the computer implementing the multipliers is conserved.

The operation of multipliers 128 and switches 130 are controlled by status information for each tap coefficient which is stored in a tap status memory 134. Each of the outputs of multipliers 128 are summed together at adder 136 and the resultant sum is subtracted from the output of the analog to digital converter 118 at a subtracter 140.

In order to correctly adapt tap values and tap status, the output of subtracter 140 is processed by an error processor 142 which evaluates the performance of the echo canceller and provides information to a tap coefficient adapter 144. The error processor produces a figure of merit or "cost" function indicative of how well the echo canceller is performing. As is known in the art, it is the job of the adaption circuitry to minimize this "cost" function to achieve optimal error cancellation. In the present invention, this "cost" function is also used to appropriately adapt the tap locations to assure good cancellation. Tap coefficient adapter 144 adapts the values of those taps which are turned ON using any of a number of known tap adaption methods such as, for example, the steepest decent method or least means square error method. Tap coefficient adapter 144 obtains information as to which taps are active from tap status memory 134 and receives inputs from error processor 142 and tap coefficient memory 132 in order to provide processing of each of the individual tap coefficients which are turned ON.

Error processor 142 also provides error information to a tap allocator 146 which is used to set the tap status in tap status memory 134 based upon the tap coefficient values stored in tap coefficient memory 132 as well as the information derived from error processing in error processor 142.

Figure 7:
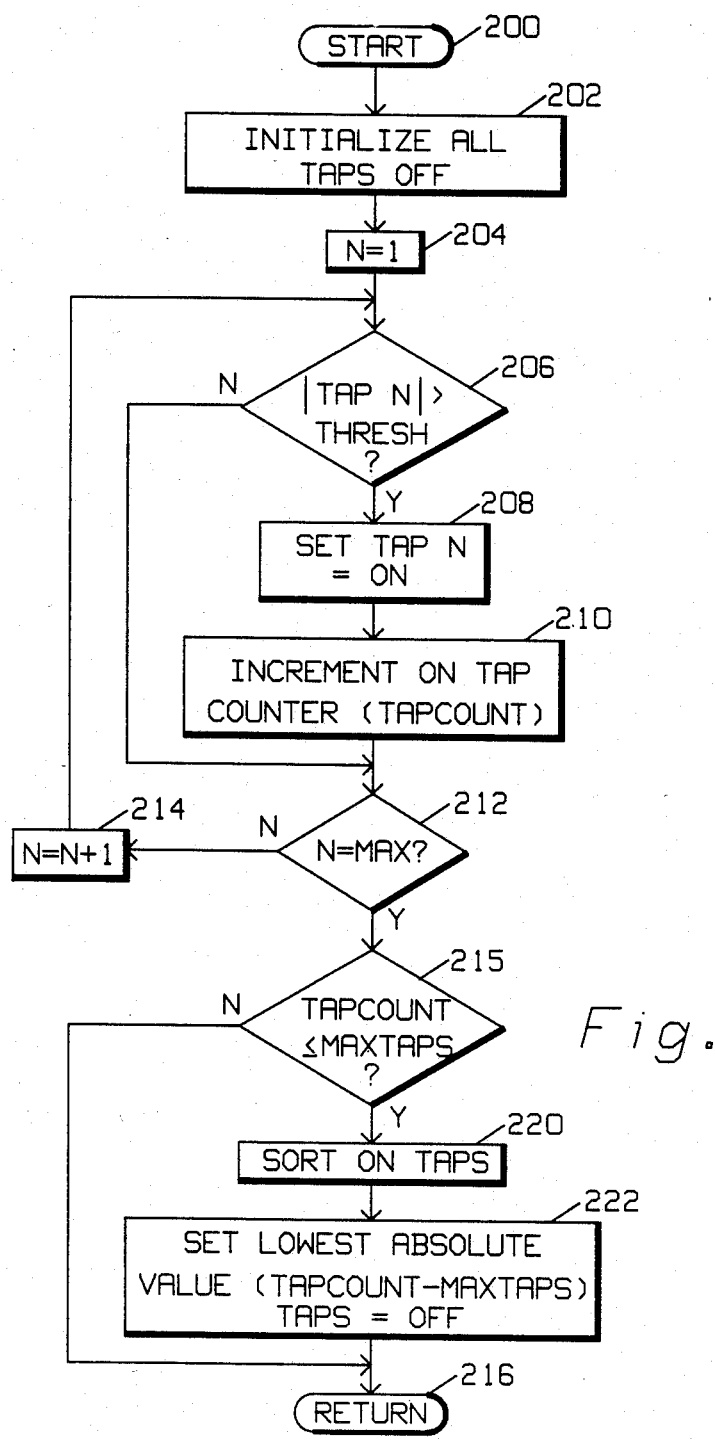
FIG. 7 shows a flow chart of a routine for initial allocation of echo canceller taps in the present invention.

Turning now to FIG. 7 a flow chart of the initial tap selection process is given. Those skilled in the art will recognize that many variations of the flow chart of FIG. 7 are possible without departing from the spirit of the present invention. The routine described by the flow chart of FIG. 7 is entered at step 200 after which the status of all taps is initialized to OFF at step 202. At step 204, N (a counter indicative of the tap position) is set equal to 1 (first tap position). At step 206, the value of the tap at location N is compared with a predetermined threshold and if the absolute value of the tap coefficient at location N is greater than the predetermined threshold, control passes to step 208 where the tap status of tap N is set to ON. At step 210 is counter is incremented to count the number of taps that have been turned ON.

After step 210 the value of N is checked to determine if the last tap has been reached at step 212. Also, if the absolute value of the tap coefficient at location N is less than or equal to the threshold at step 206, control passes to 212. In step 212 if N is not equal to the maximum value (corresponding to the maximum possible number of taps of all status) then the number N is incremented by 1 in step 214 and control is passed back to step 206. If N reaches maximum at step 212 then control passes to decision block 215 where the number of taps which have been turned ON is inspected. The present invention contemplates that it may be desirable to limit the maximum number of taps M which may be turned ON at any given time. If the number of taps which have been turned ON does not exceed the maximum allowable number of turned ON taps, control passes from step 215 to step 216 which ends the routine of FIG. 7. If on the other hand the maximum number of turned ON taps has been reached at step 215, control passes to step 220 where all of the taps which have been turned ON are sorted according to absolute value. This can be readily accomplished by any of a number of very rapid sorting routines such as the "Quicksort" algorithm. After the tap values have been sorted at step 220, the taps with the lowest absolute values are set to OFF at step 222. It is necessary in this step to turn OFF (the number of taps initially set ON)—(the maximum number of taps) in order to assure that no more than the allowed maximum number of taps is turned ON.

After the required number of taps are turned OFF in step 222, the routine is exited at step 216. It will be appreciated by those skilled in the art that if the maximum number of taps has been allocated as ON taps then there is no room for allowing any STANDBY taps as previously discussed. However, the maximum number of taps which can possibly be allocated as ON should preferably be set at a high enough level to combat the worst possible echo situation which can normally be encountered. If echoes degrade beyond this point then it may be advisable to either retrain the echo canceller or to effect repairs of the communication's channel so as to permanently reduce the undesirable echoes on the transmission line.

Figure 8:
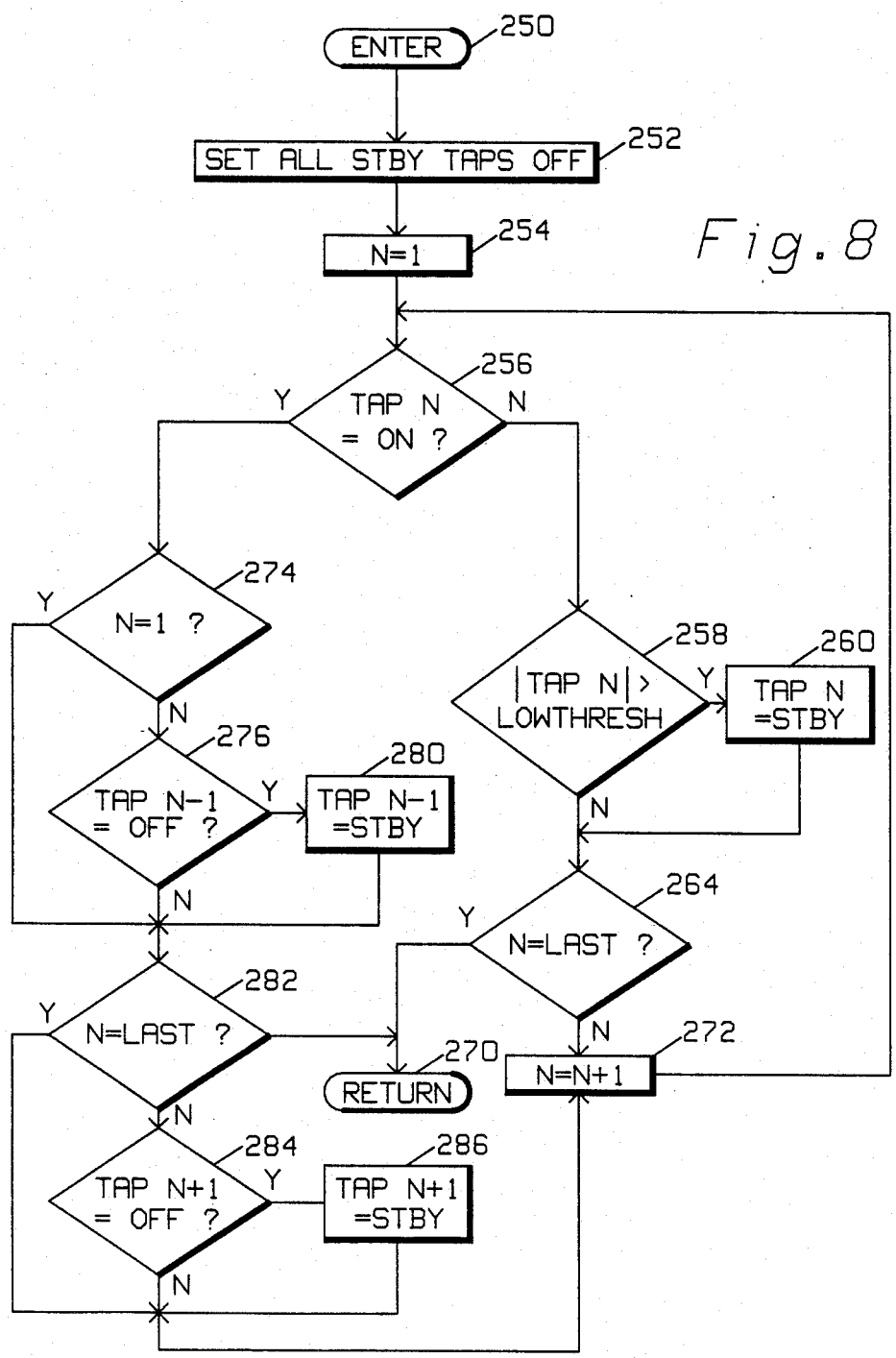
FIG. 8 shows a flow chart of a routine used to select STANDBY taps in order to adapt the tap allocation of the present invention.

It will normally be the case that far fewer taps are required to actually cancel the echo than are available to the echo canceller as ON taps. Therefore, it is contemplated that the ability to turn ON the STANDBY taps, as previously discussed, to account for changes in the impulse response of the line will generally be possible. Therefore, the flow chart of FIG. 8 shows the general mechanism for setting STANDBY taps; but, for simplicity of illustration FIG. 8, does not account for situations wherein only a limited number of STANDBY taps (or total number of ON taps) are allowed. Those skilled in the art will understand that several ways of accounting for this condition may be utilized. For example, the STANDBY taps may be prioritized and only the maximum allowed number shifted in as an attempt to regain control over echoes. In another embodiment, processing power normally used for other purposes may be diverted to the echo canceller until adequate cancellation is obtained. Alternatively, if the line's echo performance is so poor as to require virtually all available taps at all times, retraining of the echo canceller in accordance with the flow chart of FIG. 7 or effecting repairs to the line may be better alternatives.

Turning now to FIG. 8, this flow chart describes the process by which STANDBY taps are selected. The routine is entered at step 250 after which all STANDBY taps are reinitialized to the OFF status at step 252. N is set equal to 1 at 254 and control passes to decision block 256. At step 256, the status of tap N is inspected and if the tap is OFF, control passes to step 258, then where the tap's value is inspected and compared with a threshold somewhat lower than that of FIG. 7. If the tap is greater than that threshold, the tap is set to STANDBY at step 260 and control passes to step 264. If the absolute value of the tap is less than or equal to the threshold in step 258 then control passes directly to step 264 bypassing step 260. If the last tap has been inspected at step 264 the routine terminates at step 270; otherwise, the tap counter N is incremented at step 272 and control passes back to step 256. If at step 256 the tap status is ON, control passes to step 274 where it is determined whether or not the tap counter is equal to 1. If not, the previous tap is inspected at step 276 and if the previous tap's status is OFF, then the status of the previous tap is set to STANDBY at 280 after which control passes to step 282. If the previous tap is not OFF at step 276 control passes directed to step 282 bypassing step 280. Similarly if N equals 1 at step 274, steps 276 and 280 are bypassed (to avoid checking non-existent tap number 1-1 and control passes directly to 282.

At step 282 the tap counter is inspected to determine if the last tap has been encountered and if so the routine is exited at step 270. Otherwise, control passes to step 284 where the next tap (N+1) is inspected for purposes of determining its status. If the status of the next tap is OFF, then the status of the next tap is set to STANDBY at 286 and control passes from 286 directly to 272 where the tap counter is incremented. If the tap status of N+1 is not OFF and step 284 control passes directly to the tap counter incrementing step 272.

The routine of FIG. 8 incorporates both the process of selecting taps adjacent ON taps as STANDBY taps as well as selecting higher valued OFF taps as STANDBY taps. Those skilled in the art will recognize that either or both of thes techniques as well as possibly others may be utilized to select taps for STANDBY which may be good guesses as to which taps may be needed in the event that echo conditions change on the line. It is also conceivable that in some instances there is adequate processing power available to simply set all OFF taps to STANDBY so that a guess is not required. It may also be possible to simply select as many taps as possible or random or predetermined fixed locations (eg. equally spaced throughout the canceller) and achieve adequate recovery from changes in line conditions. Those skilled in the art will appreciate that greater likelihood of convergence and recovery from line changes exists as the number of STANDBY taps turned ON increases. Therefore, in the case of a maxium number of ON or STANDBY taps, the maximum number should preferably be used, thus allowing maximum likelihood of recovery from line changes. The routine shown in FIG. 8 or it's substitute should preferably be performed periodically after tap adaption to assure that there is a reliable set of STANDBY taps to engage in the event of line condition changes.

Figure 9:
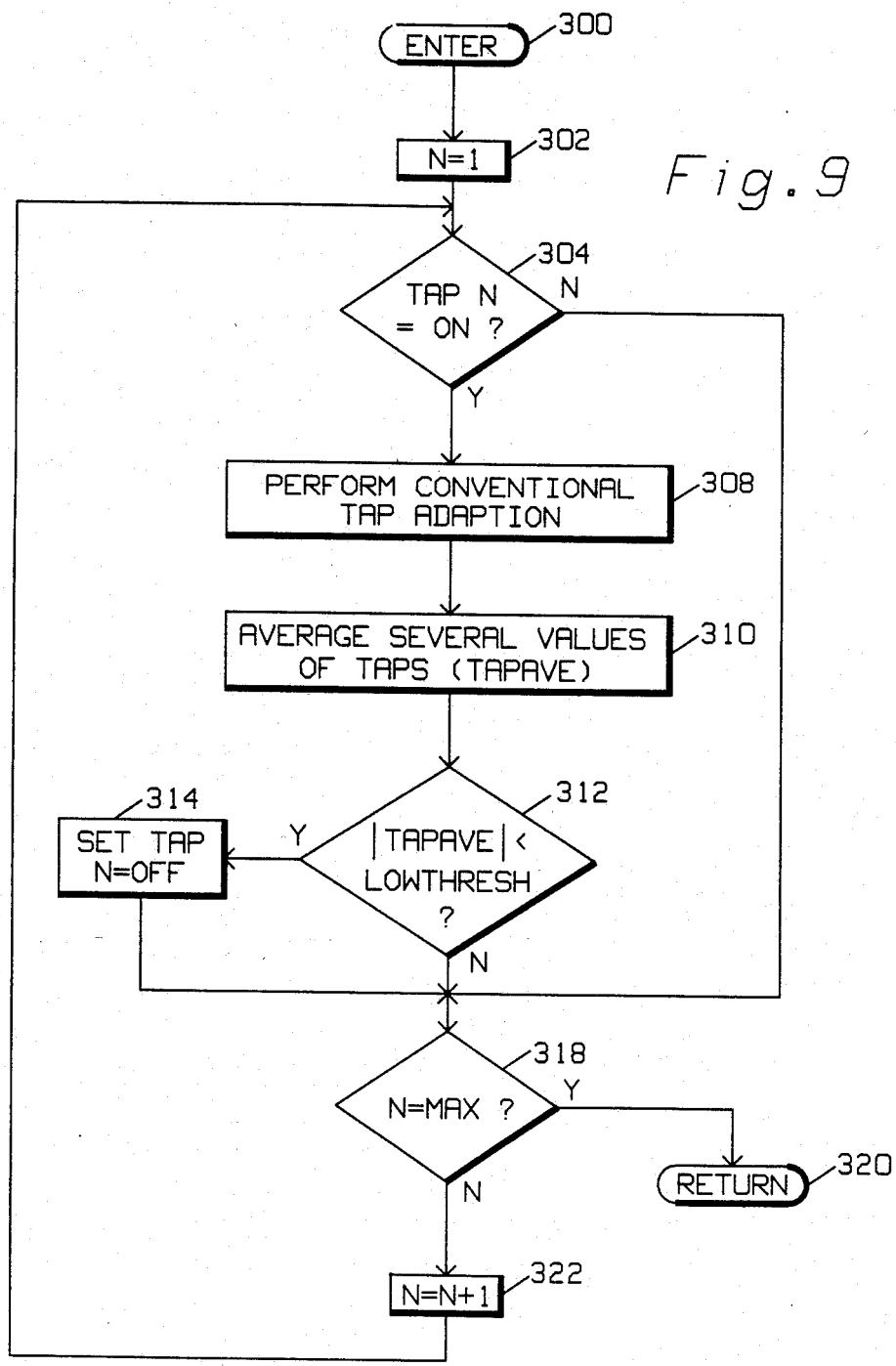
FIG. 9 shows a flow chart of a routine for dropping unneeded taps as part of an adaption process.

Turning now to FIG. 9, the tap adaption routine for ON taps is shown. This routine is entered in step 300 and N is set to 1 at 302. At step 304 the tap status is inspected for the Nth tap to determine if the tap is ON. If so, conventional tap adaption is performed on that tap at step 308. Those skilled in the art will appreciate that many techniques are available for performing tap adaption and a thorough discussion of those techniques is available in the art. At step 310 (which is an optional step) the adapted tap value is averaged with several previous tap values to obtain an average tap value (TAPAVE). At step 312 the absolute value of this average tap value is compared with a threshold somewhat lower than that of FIG. 7 and which may be equal to that of FIG. 8. If the adapted tap value average has fallen below this lower threshold at step 312 the tap's status is set to OFF at 314 and control is passed to 318. If on the other hand the absolute value of the average tap value is greater than or equal to this lower threshold at step 312, step 314 is bypassed and control is passed directly from 312 to 318. At 318 the tap counter is inspected to determine if the last tap has been processed. If so, the routine is exited at 320. Otherwise, the tap counter is incremented at 322 and control is passed back to step 304.

Figure 10:
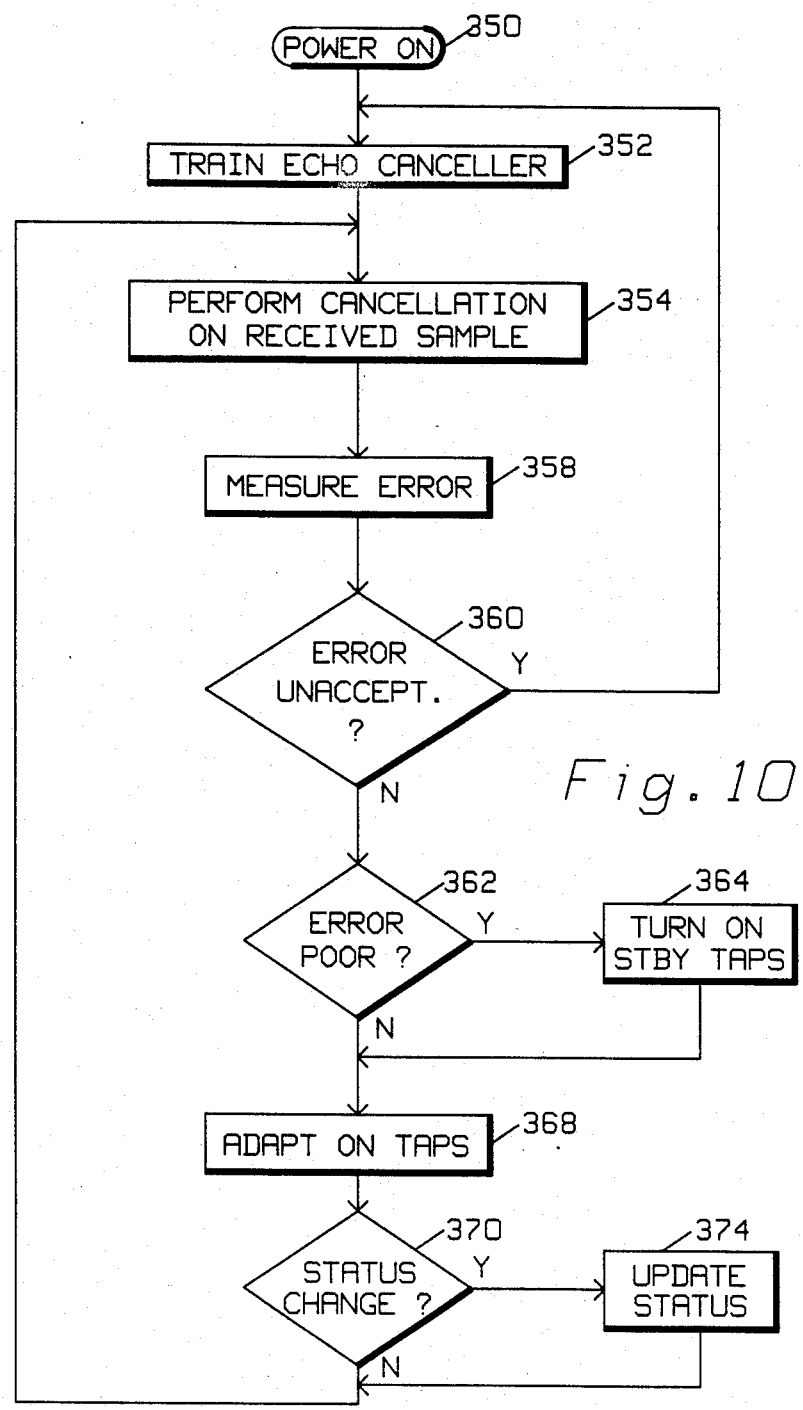
FIG. 10 shows a flow chart of the overall echo canceller operation including the process of turning on STANDBY taps.

Turning now to FIG. 10, a flow chart of the general operation of the entire echo canceller is described. At step 350 power is turned ON and any initialization is performed. At step 352 the echo canceller is trained by transmitting a test pulse down the transmission line and measuring the echo response. Those skilled in the art will recognize that other ways of initializing or training an echo canceller are also possible. Control passes from step 352 to 354 where normal echo cancellation is performed on the received signals. Error measurement is performed at step 358 and if at step 360 the error performance is unacceptable, control passes back to step 352 where the echo canceller is retrained. It may be desirable to sound an alarm if this occurs. If echo performance is not unacceptable at 360, control passes to step 362 where it is determined whether or not the error is too large (although not unacceptable). This may be done by comparing the error performance with a predetermined error threshold. If the error is too large at step 362 the STANDBY taps are turned ON at step 364 and control passes to step 368. If the error is not too large, at step 362, control passes directly to step 368 bypassing step 364.

At step 368 tap adaption takes place for the ON taps (including any STANDBY taps turned ON) and control is passed to step 370. At step 370 it is determined whether or not the ON, OFF or STANDBY status of any taps changed by virtue of adaption at step 368. If so, control passes from 370 to 374 where the tap status is updated. After updating the tap status, control passes back to step 354 where normal cancellation once again takes place. If the status of taps is not changed in step 370, control passes directly from 370 to 354.

Figure 1:
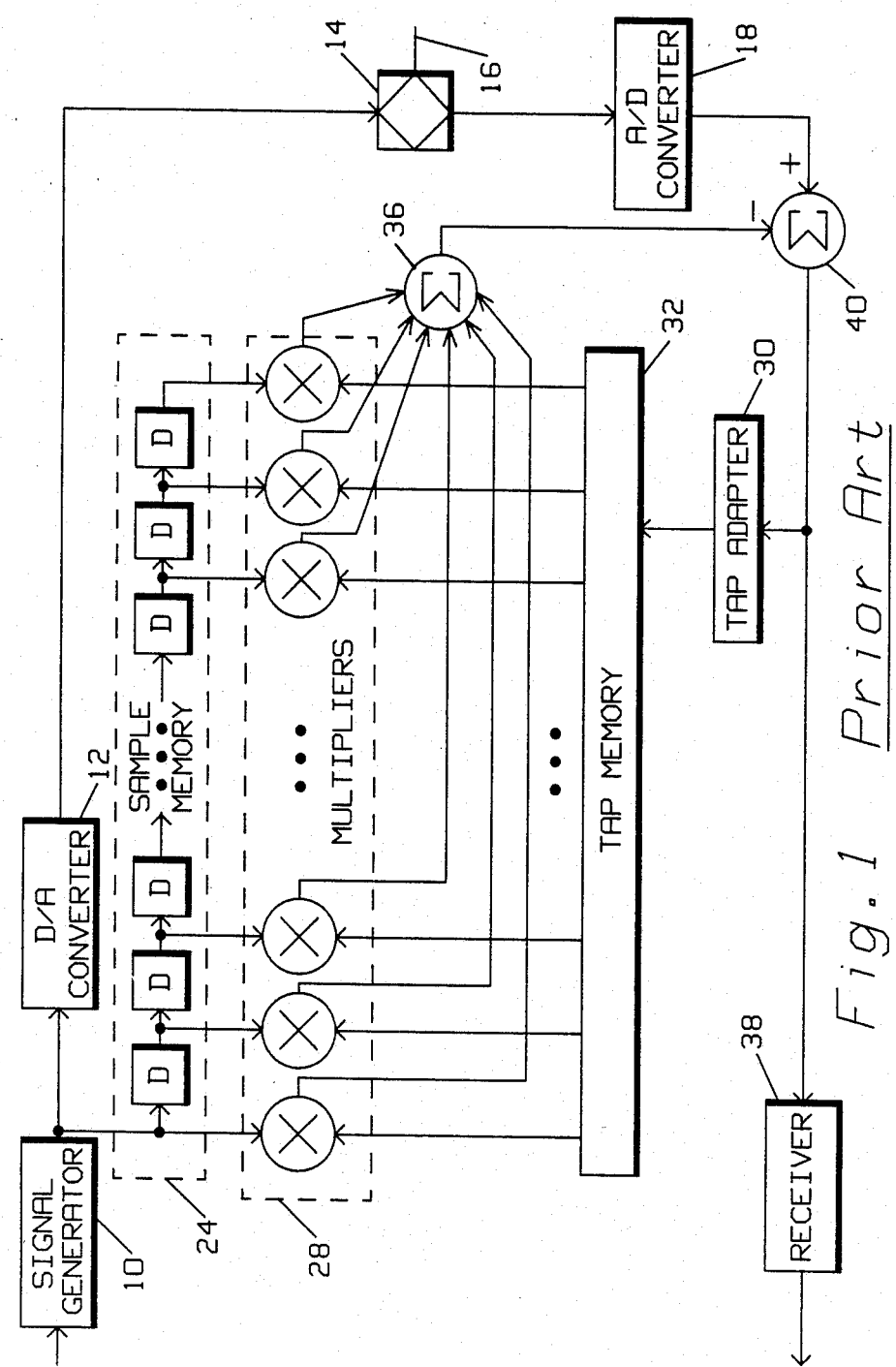
FIG. 1 shows a prior art echo canceller structure.
Figure 2:
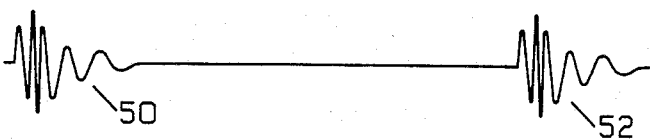
FIG. 2 shows an echo response having near end and far end components of approximately equal energy.
Figure 3:
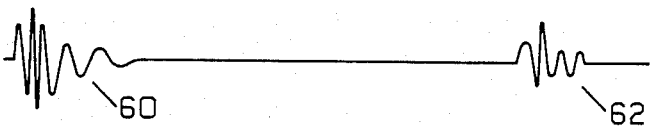
FIG. 3 shows an echo response having a small near end component and a significantly larger far end component.
Figure 4:
FIG. 4 shows an echo response or impulse response of a transmission line having near end, far end and intermediate echo energy.

In effect, tap allocator 146 operates by bypassing any multiplication operations which would be normally be performed on a particular tap. In effect, this means that multiplications which would ordinarily be carried out if the echo canceller of FIG. 4 were operating in a conventional manner are not actually carried out. In this manner, noise generated by computational inaccuracies and finite number accuracies are not passed on to the receiver, and computer power is available for other purposes. Conceptually, however, tap allocator 146 may also be thought of as setting the tap value at a particular location to zero. The net result of the present invention is that the echo canceller will operate as though it includes several bulk delay elements separating distinct echo canceller subsystems made up of single taps or groups of taps allocated in regions corresponding to areas of significant echo energy.

It should be noted that although the present invention preferably turns OFF multiplication in order to turn OFF a tap, equivalently a tap coefficient may be set equal to zero in order to turn OFF the tap at the expense of computing power. Other equivalents may be possible and are within the scope of this invention.

The present invention has been simulated on an IBM® XT personal computer using Borland International® Turbo Pascal® version 3.01. The three listings that follow, while not optimal and possibly unsuitable for real time applications, are instructive as to the implementation of the present invention on a general purpose processor. Of course, although compiled Pascal is relatively fast in execution time, it is contemplated that commercial real time applications will more advantageously use assembly language routines written for a high speed signal processing microcomputer to enhance processer performance.

Listing 1 shows a Pascal procedure for initial allocation of tap positions. The first FOR statement compares each tap value in an array (Tap) to a threshold (Thresh) and assigns a status of ON or OFF to each tap. The variable TapStatus[N] is a typed variable array having allowed values of ON, OFF and STBY. The second and third FOR statements inspect each tap in the array and assign STANDBY status to OFF taps which are adjacent ON taps. The final FOR statement inspects each tap coefficient which is OFF to a lower threshold (LowThresh) and places any taps above this threshold in the STANDBY status. No provision was made in this routine for compensating in the event that a maximum number of ON or STANDBY taps were exceeded but those skilled in the art will readily understand how to make such modifications. Also, as is evident from the fact that this routine uses four successive loops to perform it's task, no attempt has been made to optimize execution speed. Those skilled in the art will understand that this is computationally inefficient in that merger of loops will operate faster. For simulation purposes, however, this procedure is acceptable.

Listing 2 is a procedure for updating the taps after adaption. This procedure initially turns all STANDBY taps to OFF in the first FOR statement. The subsequent statements are similar to the last 3 statements of Listing 1.

Listing 3 is a procedure for inactivating taps which have dropped below a lower threshold during adaption so that they are no longer significant. No provision is made in this procedure for integrating or averaging the tap values for noise immunity. This step is readily accommodated if desired.

All listings Copyright © Racal-Milgo, 1986, all rights reserved.

In the preferred embodiment, this invention is implemented using a programmed general purpose microcomputer. The Texas Instruments ® TMS 320 family of digital signal processors may be especially well suited for implementing the present invention since these computers are especially well adapted to real time digital signal processing. However, the savings in computation afforded by this invention may provide more important advantages when other processors which are not so well adapted to digital signal processing are used since a reduced number of multiplies and divides are used. Those skilled in the art will recognize that other implementations including analog equivalents and dedicated LSI circuitry may also be used in place of general purpose processors. It will also be apparent that the present echo canceller may be implemented in either baseband or passband versions, as is known in the art, without departing from the spirit of the invention.

The present invention therefore provides a mechanism for allocating echo canceller taps only in regions where they are required for actual cancellation of echo energy. As such, unnecessary computational noise is avoided, processor power is conserved and intermediate or unusual echoes are readily handled with the same hardware that is utilized to cancel more conventional echo signals. In addition, tap selection is very rapid by virtue of use of comparison steps rather than more time consuming multiplies and divides.

Thus it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

LISTING 1

Procedure Allocate;
{Procedure for initail allocation of taps. This procedure allows for any number of taps to be on.}
```
{   N=counter
    Maxarray=Maximum number of total taps
    Tap=value of tap coefficient
    TapStatus=status of tap (ON, OFF, STBY)
    Thresh=tap turn on threshold
    LowThresh=standby threshold
}
Begin
    For   N:=1 to MaxArray Do If Abs(Tap[N]) > Thresh then
          TapStatus[N]:=ON else tapstatus[N]:=OFF;
    For   N:=2 to MaxArray do If (TapStatus[N]=ON) and
          (TapStatus[N−1]=OFF) then tapstatus[N−1]:=STBY;
    For   N:=1 to (MaxArray−1) do if (TapStatus[N]=ON) and
          (TapStatus[N+1]=OFF) then TapStatus[N+1]:=STBY;
    For   N:=1 to MaxArray do if (TapStatus[N]=OFF) and
          (abs(Tap[N])>LowThresh) then Tapstatus[N]:= STBY;
End;
```

LISTING 2

Procedure Update;
{ updates tap status after adaption. This procedure allows for any number of taps to be on.}
```
Begin
    For   N:=1 to Maxarray do If TapStatus[N]=STBY then
          TapStatus[N]:=OFF;
    For   N:=2 to Maxarray do If (TapStatus[N]=ON) and
          (TapStatus[N−1]=OFF) then TapStatus[N−1]:=STBY;
    For   N:=1 to (Maxarray−1) do if (TapStatus[N]=ON) and
          (TapStatus[N+1]=OFF) then TapStatus[N+1]:=STBY;
    For   N:=1 to MaxArray Do If (TapStatus[N]=OFF) and
          (Abs(Tap[N])>LowThresh) then TapStatus[N]:=STBY;
End;
```

LISTING 3

Procedure DropTap;
{Procedure for dropping small valued taps}
{ LowThresh=Tap drop Threshold }
```
Begin
    For   N:=1 to MaxArray Do
    Begin
       If (abs(Tap[N]) < LowThresh) and (TapStatus[N]=ON) then
       If (abs(tap[N]) < LowThresh) and (TapStatus[N]=ON) then
       TapStatus[N]:=OFF;
    End;
End;
```

What is claimed is:

1. An echo canceller for a transmission line, comprising:
    shift register means having an input for receiving an input signal from a signal source and having a plurality of output taps for providing a plurality of equally spaced delayed signals;
    tap coefficient storage means for storing a plurality of tap coefficients;
    multiplying means for multiplying certain of said delayed signals by certain of said tap coefficients to produce multiplier outputs;
    tap allocation means for determining how many and which of said taps are to be turned ON so that its corresponding tap coefficient is multiplied by said multiplying means and for assigning an ON status to said turned ON taps, a STANDBY status to taps which are not turned ON but which are more likely to be needed than others in the event of changes in transmission line characteristics, and an OFF status to any remaining taps;

tap status memory means for storing said ON, OFF or STANDBY status for each of said taps; and canceling means for canceling echoes by subtracting said multiplier outputs from signals received on said transmission line.

2. The echo canceller of claim 1, wherein said tap allocation means determines which of said taps are to be turned ON by determining which of said tap coefficients exceed a predetermined threshold in absolute value.

3. The echo canceller of claim 1, wherein said tap allocation means allows no more than a predetermined maximum number M of taps to be ON and wherein the M taps with largest absolute value are turned ON by said tap allocation means.

4. The echo canceller of claim 1, wherein said tap allocation means includes means for selecting STANDBY taps by determining which of said tap values are less than said predetermined threshold and greater than a lower predetermined threshold.

5. The echo canceller of claim 1, wherein said tap allocation means includes means for selecting STANDBY taps based upon proximity to turned ON taps.

6. The echo canceller of claim 5, wherein STANDBY taps are selected to be those taps adjacent turned ON taps.

7. The echo canceller of claim 1, further including means for adapting the values of said turned ON taps.

8. The echo canceller of claim 1, further comprising means for turning ON said STANDBY status taps when performance of said echo canceller degrades below a predetermined threshold.

9. The echo canceller of claim 7, further comprising status change means for changing the status of said taps based upon said adapted values of said taps.

10. The echo canceller of claim 9, wherein said tap allocation means includes means for assigning an ON status to taps having values greater than a first predetermined threshold and further including status change means for changing the status of said ON taps to STANDBY if said tap values drop below a second predetermined threshold, said second predetermined threshold being lower in value than said first predetermined threshold.

11. The echo canceller of claim 1, wherein said tap allocation means includes means for assigning ON status to taps having value exceeding a first predetermined threshold and for assigning STANDBY status to taps which are adjacent said ON status taps and further assigning STANDBY status to taps which exceed a second predetermined threshold.

12. The echo canceller of claim 11, further comprising adapting means for adapting the values of said taps and for changing the status of said taps based upon the adapted values of said taps.

13. A method of allocating filter taps, each having a tap weight, in an echo canceller for a transmission line, comprising:

storing a plurality of samples of a signal representative of said transmission line's impulse response in a memory;

examining each of said plurality of stored samples to determine if its magnitude is greater than a set predetermined threshold;

assigning an ON status to only those taps of said echo canceller corresponding to samples greater in magnitude than said predetermined threshold, assigning a STANDBY status to those taps deemed to be most likely to be needed if transmission line characteristics change, and assigning an OFF status to the remainder of said taps; and storing said assigned status values in a status memory.

14. The method of claim 13, further including the steps of:

determining that a number greater than a maximum number M of taps have been turned ON;

sorting said ON taps to establish an order of said ON taps according to the absolute value of said tap weights;

turning OFF all taps except those having the largest M tap weights; and assigning STANDBY status to selected OFF status taps.

15. The method of claim 13, further including the step of turning said STANDBY taps ON in the event echo canceller performance falls below a predetermined level of acceptability.

16. The method of claim 14, wherein the step of assigning a STANDBY status to certain of said taps assigns STANDBY status to taps estimated to have higher than average likelihood of being beneficial to echo cancellation when certain types of known transmission line condition changes occur.

17. The method of claim 16, wherein said step of assigning a STANDBY status includes assigning said STANDBY status to taps having taps weights of absolute value greater than a level.

18. The method of claim 16, wherein said step of assigning a STANDBY status includes assigning said STANDBY status to taps which are adjacent ON taps.

19. The method of claim 17, wherein said step of assigning a STANDBY status also includes assigning said STANDBY status to taps which are adjacent ON taps.

20. The method of claim 16, further including the step of turning said STANDBY taps ON in the event echo cancellation degrades below a predetermined level.

* * * * *